US009525650B2

(12) United States Patent
Dong et al.

(10) Patent No.: US 9,525,650 B2
(45) Date of Patent: Dec. 20, 2016

(54) METHOD AND SYSTEM FOR UPDATING REORDER DEPTH IN ROBUST HEADER COMPRESSION

(75) Inventors: Shusong Dong, Shenzhen (CN); Wenyong Bi, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 293 days.

(21) Appl. No.: 14/003,543

(22) PCT Filed: Nov. 22, 2011

(86) PCT No.: PCT/CN2011/082618
§ 371 (c)(1),
(2), (4) Date: Sep. 6, 2013

(87) PCT Pub. No.: WO2012/142833
PCT Pub. Date: Oct. 26, 2012

(65) Prior Publication Data
US 2013/0336328 A1    Dec. 19, 2013

(30) Foreign Application Priority Data
Apr. 20, 2011    (CN) .......................... 2011 1 0099661

(51) Int. Cl.
*H04L 12/28*    (2006.01)
*H04L 12/861*    (2013.01)
(Continued)

(52) U.S. Cl.
CPC ....... *H04L 49/9057* (2013.01); *H04L 12/6418* (2013.01); *H04L 69/04* (2013.01);
(Continued)

(58) Field of Classification Search
CPC ...... H04W 28/06; H04L 29/0604; H04L 69/04
See application file for complete search history.

(56) References Cited

U.S. PATENT DOCUMENTS 7,072,342 B1 *    7/2006    Elnathan .............. H04L 49/9094
                                                                      370/394
7,349,398 B1 *    3/2008    Favor ...................... H04L 49/90
                                                                        370/394
(Continued)

FOREIGN PATENT DOCUMENTS

CN    101371552 A    2/2009
CN    101453298 A    6/2009
(Continued)

OTHER PUBLICATIONS

International Search Report of PCt/CN2011/082618 dated Mar. 8, 2012.

*Primary Examiner* — Melanie Jagannathan
(74) *Attorney, Agent, or Firm* — Banner & Witcoff, Ltd.

(57) ABSTRACT

The present document provides a method and system for updating a reorder depth in robust header compression. The method comprises: when determining a reorder occurs in data packets, a decompressor estimating the reorder situation, and determining whether a more robust reorder processing policy needs to be used according to the reorder situation; if it needs not to be used, maintaining a reorder depth value at the decompressor side; if it needs to be used, updating the reorder depth value at the decompressor side to a greater value, and transmitting a feedback packet carrying the updated reorder depth value to a compressor; and after receiving the feedback packet, the compressor updating the reorder depth value at the compressor side according to the reorder depth value in the feedback packet.

17 Claims, 7 Drawing Sheets

(51) Int. Cl.
*H04W 28/06* (2009.01)
*H04L 29/06* (2006.01)
*H04L 12/64* (2006.01)
*H04L 1/00* (2006.01)

(52) U.S. Cl.
CPC ............ *H04L 69/22* (2013.01); *H04W 28/06* (2013.01); *H04L 1/0061* (2013.01)

(56) References Cited

U.S. PATENT DOCUMENTS

| | | | | |
|---|---|---|---|---|
| 2002/0191614 A1* | 12/2002 | Ido | ............ | H03M 7/30 370/394 |
| 2003/0214949 A1* | 11/2003 | Shaikli | ............ | H04L 12/5693 370/394 |
| 2005/0180327 A1* | 8/2005 | Banerjee | ............ | H04L 47/10 370/236 |
| 2005/0195750 A1* | 9/2005 | Le | ............ | H04L 1/1809 370/252 |
| 2006/0187846 A1* | 8/2006 | Pelletier | ............ | H04W 28/06 370/252 |
| 2007/0058679 A1* | 3/2007 | Pelletier | ............ | H04W 28/06 370/477 |
| 2007/0165604 A1* | 7/2007 | Mooney | ............ | H04L 69/04 370/352 |
| 2007/0274317 A1* | 11/2007 | Pelletier | ............ | H04L 47/10 370/394 |
| 2009/0259925 A1* | 10/2009 | Balasubramanian | .. | H04H 20/95 714/807 |

FOREIGN PATENT DOCUMENTS

| | | |
|---|---|---|
| CN | 101835196 A | 9/2010 |
| CN | 102149135 A | 8/2011 |
| WO | 2007/082049 A1 | 7/2007 |

* cited by examiner

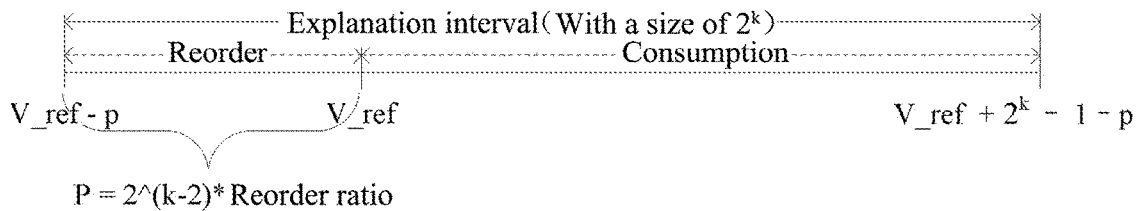

When determining that a reorder occurs in data packets, a decompressor estimates a reorder situation, and determines whether a more robust reorder processing policy needs to be used according to the reorder situation; if it needs not to be used, maintains a reorder depth value at the decompressor side; if it needs to be used, updates the reorder depth value at the decompressor side to a greater value, and transmits a feedback packet carrying the updated reorder depth value to a compressor

S202

After receiving the feedback packet, the compressor updates the reorder depth value at the compressor side according to the reorder depth value in the feedback packet

FIG. 2

| Option type = 15 | Option length = 1 |
|---|---|
| Reorder ratio ||

FIG. 3

METHOD AND SYSTEM FOR UPDATING REORDER DEPTH IN ROBUST HEADER COMPRESSION

TECHNICAL FIELD

The present document relates to an algorithm for robust header compression in the mobile communication field, and in particular, to a method of closed-loop restoring a P value used in a Least Significant Bits (LSB) algorithm by measuring reorder_ratio in the situation of a reorder submission link.

BACKGROUND OF THE RELATED ART

Due to the limitation of physical conditions, in a mobile communication system, a wireless link has a lower transmission rate and a higher bit error rate than a wired link. In order to effectively use the limited wireless channel bandwidth resources, the RObust Header Compress (hereinafter referred to as the ROHC) technology is introduced. The core of the ROHC is to use information redundancy between packets of a traffic flow to transparently compress and decompress the information in headers of packets between nodes which are connected directly. The ROHC technology is described in the Internet Engineering Task Force (IETF) RFC3095 document.

The Least Significant Bits (LSB) algorithm is an important algorithm in the ROHC technology, which is mainly used to compress the Master Sequence Number (MSN) information. The LSB compression algorithm performs LSB compression on a value A which is to be compressed and occupies k1 bits by using one reference value V_ref and specifying a P value, and subsequently obtains a compressed value B which occupies less k2 bits and is associated with the V_ref. Through the LSB compression, bits with no change are deleted, and the B value represents the least significant bits which change from the value V_ref to the value A (i.e., B=low k2 bits of A). The process of recovering the compressed value using the LSB decompression is contrary to the above process.

ROHC is released in 2001, and because the reorder submission situation did not exist in the link at that time, the ROHC is defined to be applied to an order submission link at the beginning of the design. As time goes on, the ROHC has been widely used in more and more wireless devices, and compared with other compression algorithms, "the ROHC being not capable of working effectively on a reorder submission link" becomes a weakness of the ROHC.

On the order submission link, compressed packets which are transmitted from a source end ROHC compressor can be submitted to a ROHC decompressor in order at the destination end after being transmitted over a link. For example, if the compressor transmits five data packets, i.e., 1, 2, 3, 4, 5 in order, the order of receiving these data packets by the decompressor is also 1, 2, 3, 4, 5, and such a process is desired by the ROHC, and is also a condition for a normal work; while in a reorder submission link, the order of the data packets may be influenced by an underlying link, which makes the order of the data packets received by the ROHC decompressor at the destination end is different from the order of transmission by the ROHC compressor at the source end, thus finally resulting in that the decompressor can not decompress the data packets normally. For example, if the compressor transmits five data packets, i.e., 1, 2, 3, 4, 5 in order, in the process of link transmission, as a false retransmission occurs with respect to data packet 3 on an underlying link, which makes the order of receiving these data packets by the decompressor be 1, 2, 4, 5, 3, wherein, data packet 3 is referred to as a late sequence packet, and data packets 4 and 5 are referred to as early sequence packets, and the number of the early sequence packets is referred to as a reorder depth, which is 2 in this example. Such a process is not desired by the ROHC, and abnormal processing for the early sequence packets may cause a failure of the decompression of the late sequence packets, thus resulting in state transition of the decompressor and influencing the compression efficiency; and abnormal processing for the late sequence packets may cause asynchronization of contexts of the compressor and the decompressor, and influence the robustness. As the reorder process of the data packets in the link can not be anticipated and it may occur in any stage of the ROHC process, when this situation comes forth, the method for processing the data packet 3, 4 and 5 will influence the efficiency and robustness of the whole ROHC directly.

In order to improve such a situation, the RFC4224 document was released by IETE in 2006, and in this document, a plurality of methods which can enhance the compression efficiency and robustness of a reorder submission link in terms of how to be compatible with the reorder submission link by the ROHC are provided. However, in all schemes proposed in the RFC4224, as there is no feedback related to the reorder depth between the compressor and the decompressor, the compressor can not exactly obtain a maximum reorder depth of the current link, which finally results in that the compressor can only unilaterally perform estimation when selecting a suitable LSB encoded P value, and such an estimation can not really avoid the decompression problem due to the reorder in some cases.

As the second version of the ROHC, the RFC 5225 uses a number of ideas in the RFC 4224, and introduces a concept of reorder_ratio when calculating the LSB P value, i.e., dynamically adjusting the LSB P value as $2^{(k-2)}$*reorder_ratio (as shown in FIG. 1, wherein, a value of reorder_ratio can only be one of 0, 1, 2 and 3), so that the ROHCv2 can support the reorder submission to some extent.

However, in the specific implementation, as there is no communication between the compressor and the decompressor against the reorder situation in the current link, one can not accurately select the value. For example, when the compressor solves the reorder submission problem by adjusting the P value in the LSB algorithm, the value of the P is selected as $2^k/3$ by way of example in the RFC 4224 document, but the document does not describe whether to select $2^k/4$, $2^k/2$ or $2^k*3/4$ in different links. As for the whole ROHC, the compression efficiency and robustness when selecting different P values is totally different, for the RFC5225 per se, it does not introduce a new reorder processing method, and thus it can not solve the problem exist in the RFC4224 as well.

SUMMARY OF THE INVENTION

The technical problem to be solved by the present document is to provide a method and system for updating a reorder depth in robust header compression, which can effectively update the reorder depth according to the reorder conditions, so as to dynamically adjust the LSB P value, which not only effectively ensures the robustness of the current compression policy, but also ensures the compression efficiency.

In order to solve the above technical problem, the present document provides a method for updating a reorder depth in robust header compression, comprising:

when determining that a reorder occurs in data packets, a decompressor estimating a reorder situation, and determining whether a more robust reorder processing policy needs to be used according to the reorder situation; if it needs not to be used, maintaining a reorder depth value at the decompressor side; if it needs to be used, updating the reorder depth value at the decompressor side to a greater value, and transmitting a feedback packet carrying the updated reorder depth value to a compressor;

after receiving the feedback packet, the compressor updating the reorder depth value at the compressor side according to the reorder depth value in the feedback packet.

Preferably, the above method can further have the following features:

the decompressor determining whether a reorder occurs in data packets comprises:

comparing a sequence number of the received data packet with a recorded current maximum sequence number, if the sequence number of the received data packet is less than the maximum sequence number, considering that the reorder occurs; otherwise, considering that the reorder does not occur, and updating the maximum sequence number to the sequence number of the received data packet.

Preferably, the above method can further have the following features:

before the decompressor determines whether a reorder occurs in data packets, the method further comprises:

recovering the data packet according to the sequence number of the received data packet, verifying the recovered data packet, if the verification is successful, performing reorder determination; if the verification is failed, performing reorder restoring, and if the restoration is successful, performing the reorder determination; and if the restoration is failed, discarding the data packet and not performing the reorder determination;

the reorder restoring comprises: determining whether the reorder depth value at the decompressor side can be increased, if it can not be increased, considering that the restoration is failed; if it can further be increased, performing recovery calculation on the sequence number using a greater value as the reorder depth value at the decompressor side, recovering the data packet with a recovered new sequence number, verifying the recovered data packet, and if the verification is failed, considering that the restoration is failed, and if the verification is successful, considering that the restoration is successful and updating a restoration success number record.

Preferably, the above method can further have the following features:

the decompressor estimating the reorder situation comprises: estimating the reorder situation according to the restoration success number record and the reorder depth value at the decompressor side;

after the decompressor updates the reorder depth value at the decompressor side, setting the restoration success number record as an initial value.

Preferably, the above method can further have the following features:

the compressor updating the reorder depth value at the compressor side according to the reorder depth value in the feedback packet comprises:

determining whether the reorder depth value at the compressor side is less than the reorder depth value in the feedback packet, if it is less than the reorder depth value in the feedback packet, updating the reorder depth value at the compressor side to a reorder depth value in the feedback packet; otherwise, transmitting an Initialization and Refresh (IR) packet to the decompressor, to perform reorder depth value synchronization.

Preferably, the above method can further have the following features:

the greater value is equal to a value which is the reorder depth value at the decompressor side added by 1 itself; and the reorder depth value comprises 0, 1, 2, 3.

In order to solve the above technical problems, the present document further provides a decompressor, comprising:

a receiving module, configured to receive robust header compression data packets;

a storage module, configured to store a reorder depth value;

a reorder detection module, connected with the receiving module, and configured to detect whether a reorder occurs in data packets received by the receiving module, and transmit a reorder estimation instruction when it is detected that the reorder occurs;

a reorder estimation module, connected with the reorder detection module, and configured to estimate a reorder situation according to the reorder estimation instruction to get an estimation result;

an update determination module, connected with the reorder estimation module, and configured to determine whether it is needed to use a more robust reorder processing policy according to the estimation result, and if it is needed, transmit a reorder depth update instruction; and a reorder depth updating module, connected with both the storage module and the update determination module, and configured to update the reorder depth value in the storage module to a greater value according to the reorder depth updating instruction, and transmit a feedback packet carrying the updated reorder depth value.

Preferably, the above decompressor can further have the following features:

the storage module is further configured to store a current maximum sequence number;

the reorder detection module comprises:

a comparison unit, configured to compare a sequence number of the received data packet with the current maximum sequence number to get a comparison result; and a determining processing unit, connected with both the comparison unit and the storage module, and configured to obtain and determine the comparison result, and if the comparison result is that the sequence number of the received data packet is less than the maximum sequence number, consider that the reorder occurs; otherwise, consider that the reorder does not occur, and update the maximum sequence number in the storage module to the sequence number of the received data packet.

Preferably, the above decompressor can further have the following features:

the storage module is further configured to store a restoration success number record;

the reorder detection module is further configured to perform reorder detection only after receiving a detection control instruction;

the decompressor further comprises:

a verifying module, located between the receiving module and the reorder detection module, and configured to recover the data packet according to the sequence number of the received data packet, verify the recovered data packet, if the verification is successful, transmit the detection control instruction to the reorder detection module; and if the verification is failed, transmit a reorder restoring instruction; and a reorder restoring module, connected to both the verifying module and the reorder detection module, and configured to determine whether the reorder depth value in the storage module can be further increased, if it can not be increased, consider that the restoration is failed, and discard the data packet; and if it can be further increased, perform recovery calculation on the sequence number using a greater value as the reorder depth value at the decompressor side, recover the data packet with a recovered new sequence number, verify the recovered data packet, and if the verification is failed, consider that the restoration is failed, and discard the data packet; and if the verification is successful, consider that the restoration is successful, and update a restoration success number record, and transmit the detection control instruction to the reorder detection module.

Preferably, the above decompressor can further have the following features:

the reorder estimation module is configured to estimate the reorder situation according to a restoration success number record and the reorder depth value in the storage module when estimating the reorder situation;

the reorder depth updating module is further configured to set the restoration success number record in the storage module as an initial value after updating the reorder depth value in the storage module.

Preferably, the above decompressor can further have the following features:

the greater value is equal to a value which is the reorder depth value at the decompressor side added by 1 itself; and the reorder depth value comprises 0, 1, 2, 3.

In order to solve the above technical problem, the present document further provides a compressor, comprising:

a storage module, configured to store a reorder depth value;

a receiving and parsing module, configured to receive a feedback packet comprising a reorder depth value and parse out the reorder depth value from the feedback packet;

a comparison module, connected with both the receiving and parsing module and the storage module, and configured to compare whether the reorder depth value in the storage module is less than the reorder depth value in the feedback packet to get a comparison result; and an updating processing module, connected with the storage module and the comparison module, and configured to update the reorder depth value in the storage module to the reorder depth value in the feedback packet when the comparison result is that the reorder depth value in the storage module is less than the reorder depth value in the feedback packet; otherwise, transmit an Initialization and Refresh (IR) packet to perform reorder depth value synchronization with a decompressor.

In order to solve the above technical problem, the present document further provides a system for updating a reorder depth in robust header compression, comprising the decompressor and the compressor as described above.

The method and system for updating a reorder depth in robust header compression provided by the embodiments of the present document can effectively update the reorder depth according to the reorder conditions, so as to dynamically adjust the LSB P value, which not only effectively ensures the robustness of the current compression policy, but also ensures the compression efficiency.

BRIEF DESCRIPTION OF DRAWINGS

FIG. 1 is a diagram of a relationship between a P value in a LSB algorithm which is defined by a protocol and a reorder_ratio;

FIG. 2 is a flowchart of a method for updating a reorder depth in robust header compression according to embodiment one of the present document;

FIG. 3 is a diagram of a feedback option of the Reorder_Ratio defined according to an embodiment of the present document;

PREFERRED EMBODIMENTS OF THE INVENTION

Figure 4:
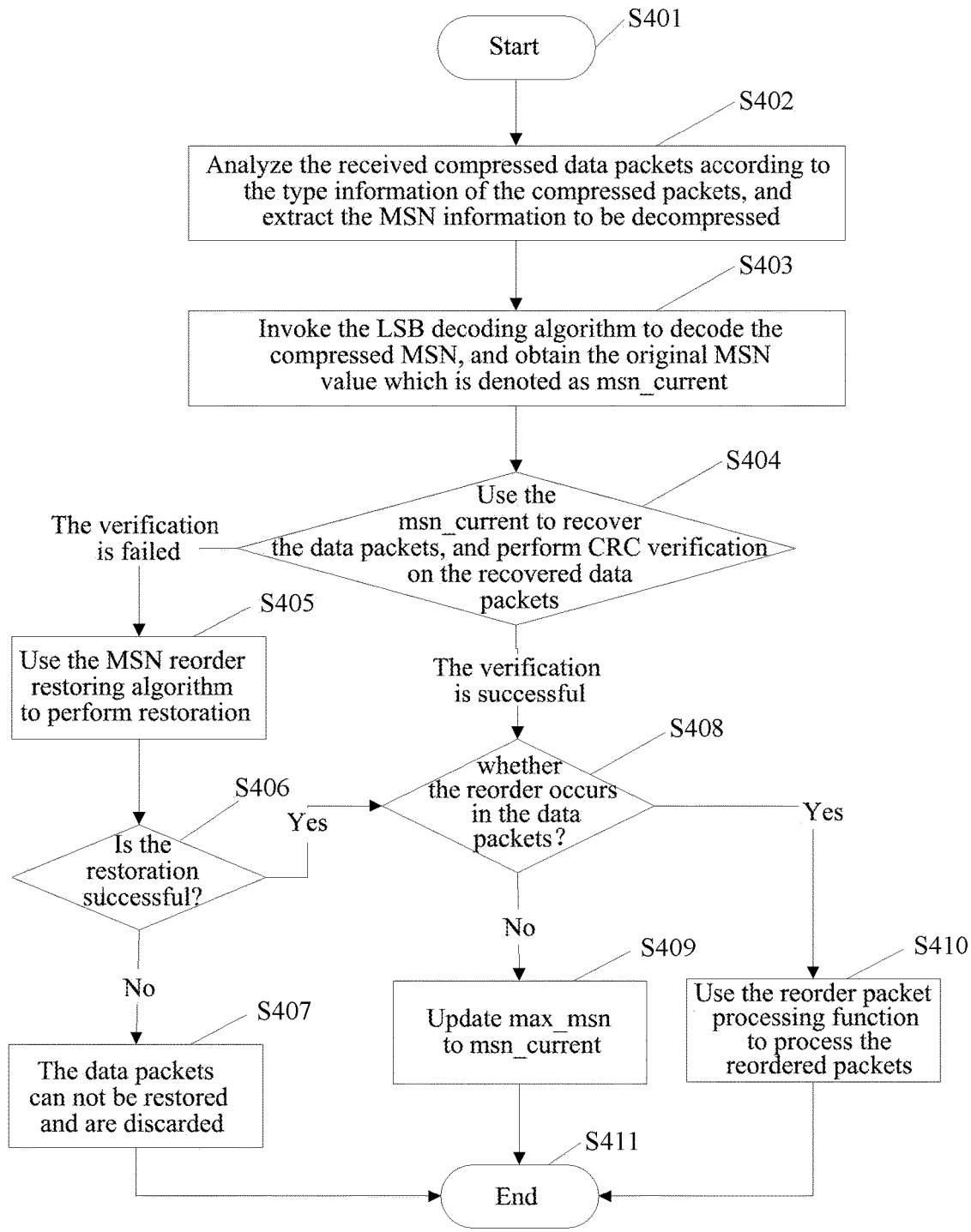
FIG. 4 is a flowchart of a general process when a decompressor receives compressed packets according to an embodiment of the present document.

In order to make the purpose, technical schemes and advantages of the present document more clear and apparent, the embodiments of the present document will be described in detail in combination with accompanying drawings hereinafter. It should be illustrated that, the embodiments in the present application and the features in the embodiments can be arbitrarily combined with each other in the case of no conflict.

With respect to FIG. 2, a method for updating a reorder depth in robust header compression according to embodiment one of the present document is illustrated, and the method comprises the following steps:

In step S201, when determining that a reorder occurs in data packets, a decompressor estimates a reorder situation, and determines whether a more robust reorder processing policy needs to be used according to the reorder situation; if it needs not to be used, maintains a reorder depth value reorder_ratio_D at the decompressor side; if it needs to be used, updates the reorder depth value reorder_ratio_D at the decompressor side to a greater value, and transmits a feedback packet carrying the updated reorder depth value reorder_ratio_D to a compressor;

In step S202, after receiving the feedback packet, the compressor updates the reorder depth value reorder_ratio_C at the compressor side according to the reorder depth value reorder_ratio_D in the feedback packet.

The embodiment of the present document increases a reorder analysis processing function in the decompression process, and when the robustness appeared by the current reorder processing policy against the current reorder situation is not good, it is to try to increase the reorder depth value and notify the compressor side to perform synchronous updating by means of a feedback packet, and it is to actively try to change the LSB P value, so as to be able to restore the data packets falling outside the LSB interval in a certain proportion and reduce the packet loss in the header compression process.

Wherein, in step S201, the decompressor can determine whether a reorder occurs in data packets by the following determination way: comparing a sequence number msn_current of the received data packet with a recorded current maximum sequence number max_msn; and if the sequence number msn_current of the received data packet is less than the maximum sequence number max_msn, it considers that the reorder occurs; otherwise, it considers that the reorder does not occur, and updates the maximum sequence number max_msn to the sequence number msn_current of the received data packet.

Wherein, in step S201, the feedback packet carrying the updated reorder depth value reorder_ratio_D is shown in FIG. 3.

Preferably, in step S201, the greater value can be selected as a value which is the reorder depth value at the decompressor side added by 1 itself.

Preferably, before step S201, the following step S203 (not shown in the figure) can be further included:

In step S203, it is to recover the data packet according to the sequence number msn_current of the received data packet, the recovered data packet is verified, if the verification is successful, reorder determination is performed; if the verification is failed, reorder restoring is performed, and if the restoration is successful, the reorder determination is performed; and if the restoration is failed, the data packet is discarded and the reorder determination is not performed.

Wherein, the reorder restoring in step S203 can comprise: determining whether the reorder depth value at the decompressor side can be increased, if it can not be increased, considering that the restoration is failed; if it can further be increased, performing recovery calculation on the sequence number using a greater value as the reorder depth value reorder_ratio_D at the decompressor side, recovering the data packet with a recovered new sequence number msn_currtent_new, verifying the recovered data packet, and if the verification is failed, considering that the restoration is failed, and if the verification is successful, considering that the restoration is successful and updating a restoration success number record. Preferably, the greater value can be selected as a value which is the reorder depth value at the decompressor side added by 1 itself.

Wherein, the verification can be verification such as CRC, which is not limited by the present document here.

Wherein, the restoration success number record can be recorded by a counter.

The present embodiment of the present document adds a reorder restoring function (step 203) in the decompression process, i.e., it is to guess the reason why the verification is failed, and take the LSB calculation failure due to the late sequence packets as its primary reason, and adjust the decompression reference interval of the LSB algorithm according to the current reorder_ratio value, recover the MSN value again, and finally perform CRC verification again, so as to verify whether the reason why the verification is failed is due to the late sequence packets, and if it is due to the late sequence packets, it is to perform reorder processing on the data packets for which the verification is failed.

Wherein, in step S201, the decompressor can estimate the reorder situation as follows: estimating the reorder situation according to the restoration success number record and the reorder depth value at the decompressor side. For example, the determination condition can be set as: when repair_num>=100, considering that it needs to use a more robust reorder policy; or the determination condition is set as: when (repair_num)/(reorder_ratio+1)>=100, considering that it needs to use a more robust reorder policy. The specific determination condition can be set as needed, and is not limited by the present document here. Accordingly, after updating the reorder depth value at the decompressor side, the decompressor further sets the restoration success number record repair_num as an initial value.

Wherein, in step S202, the compressor updating the reorder depth value at the compressor side according to the reorder depth value in the feedback packet can comprise the following steps: determining whether the reorder depth value at the compressor side is less than the reorder depth value in the feedback packet, if it is less than the reorder depth value in the feedback packet, updating the reorder depth value at the compressor side to a reorder depth value in the feedback packet; otherwise, transmitting an Initialization and Refresh (IR) packet to the decompressor to perform reorder depth value synchronization.

In order to further illustrate the above scheme of the present document, the following will be illustrated in combination with FIGS. 4, 5, 6 and 7.

With respect to FIG. 4, a procedure of processing the compressed data packets by the decompressor involved in the present document is illustrated, and comprises the following steps:

in step S401, the decompression procedure by the decompressor starts, and it is to proceed to step S402;

in step S402, the decompressor analyzes the received compressed data packets according to the type information of the compressed packets, and extracts the MSN information to be decompressed, and it is to proceed to step S403;

in step S403, the decompressor invokes the LSB decoding algorithm to decode the compressed MSN, and obtains the original MSN value which is denoted as msn_current, and it is to proceed to step S404;

in step S404, the decompressor uses the msn_current to recover the data packets, and performs CRC verification on the recovered data packets, if the verification is failed, it is to proceed to step S405, and if the verification is successful, it is to proceed to step S408;

in step S405, the decompressor uses the MSN reorder restoring algorithm to perform restoring, and it is to proceed to step S406;

in step S406, the decompressor determines whether the restoration by using the MSN reorder restoring algorithm is successful, if the restoration is successful, it is to proceed to step S408, and if the restoration is failed, it is to proceed to step S407;

in step S407, the decompressor considers that the data packets can not be restored, and discards the data packets, and it is to proceed to step S411;

in step S408, the decompressor determines whether the reorder occurs in the data packets, and if the reorder does not occur, it is to proceed to step S409, and if the reorder occurs, it is to proceed to step S410;

in step S409, the decompressor updates max_msn to msn_current, and it is to proceed to step S411;

in step S410, the decompressor uses the reorder packet processing function to process the reordered packets, and it is to proceed to step S411;

in step S411, the process procedure by the decompressor ends.

Figure 5:
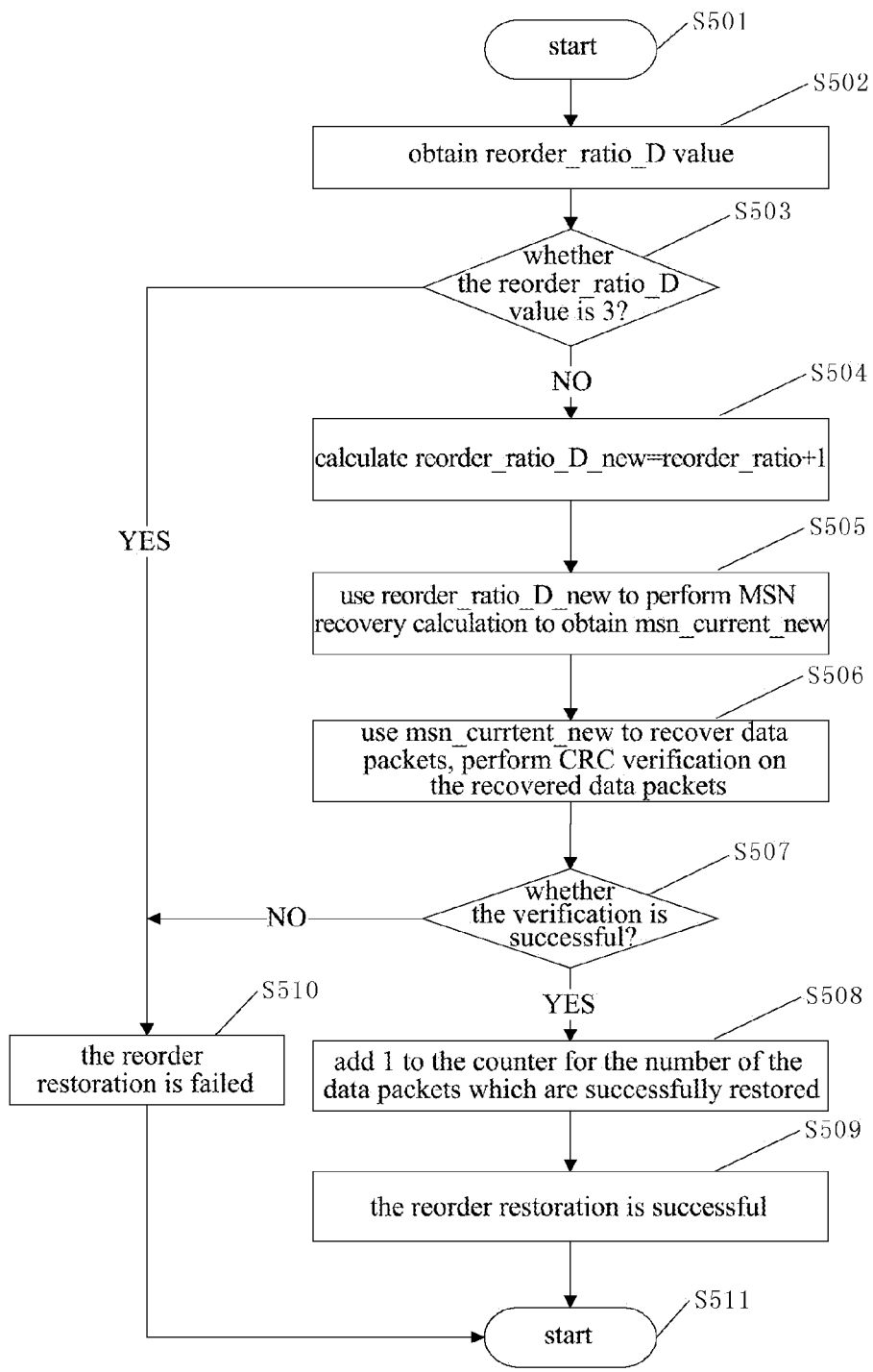
FIG. 5 is a flowchart of a method for performing MSN reorder restoring by a decompressor according to an embodiment of the present document.

With respect to FIG. 5, a specific implementation scheme of the MSN reorder restoring algorithm (step S405) by the decompressor involved in the present document is illustrated.

in step S501, the reorder restoring procedure by the decompressor starts, and it is to proceed to step S502;

in step S502, the decompressor obtains a reorder_ratio_D value, and it is to proceed to step S503;

in step S503, the decompressor determines whether the reorder_ratio_D value is the maximum 3, and if it is the maximum 3, it is to proceed to step S201; otherwise, it is to proceed to step S504;

in step S504, the decompressor calculates reorder_ratio_D_new=reorder_ratio+1, uses reorder_ratio_D_new as a new reorder_ratio_D value, and it is to proceed to step S505;

in step S505, the decompressor uses reorder_ratio_D_new to perform MSN recovery calculation to obtain msn_current new, and it is to proceed to step S506;

in step S506, the decompressor uses msn_currtent_new to recover data packets, performs CRC verification on the recovered data packets, and it is to proceed to step S507;

in step S507, whether the verification is successful is determined, if it is successful, it is to proceed to step S508; and if it is failed, it is to proceed to step S510;

in step S508, the decompressor adds 1 to the counter for the number of the data packets which are successfully restored, and it is to proceed to step S509;

in step S509, the reorder restoring by the decompressor is successful, and it is to proceed to step S511;

in step S510, the reorder restoring by the decompressor is failed, and it is to proceed to step S511;

in step S511, the MSN reorder restoring procedure by the decompressor ends.

Figure 6:
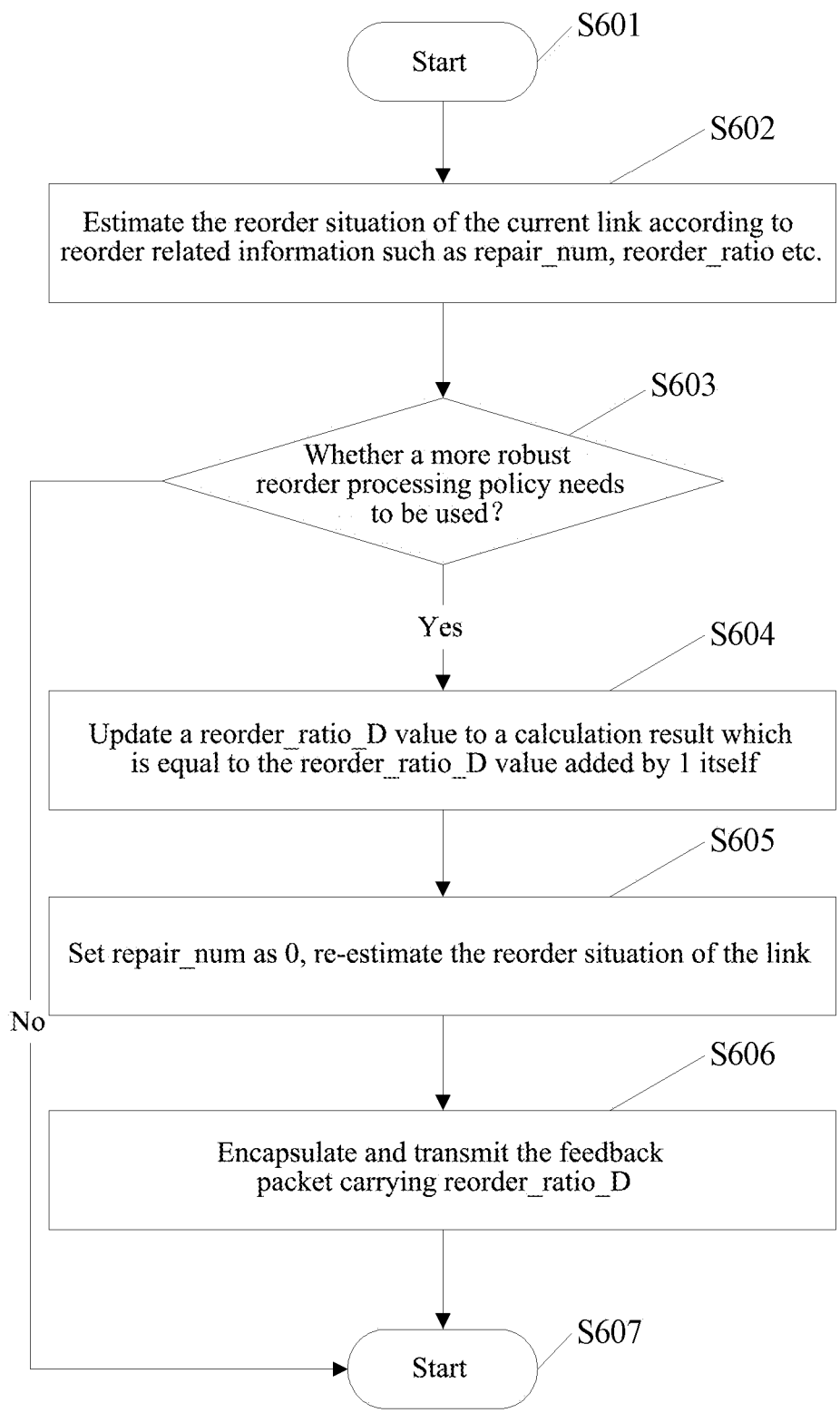
FIG. 6 is a flowchart of a method for processing reordered data packets by a decompressor according to an embodiment of the present document.

With respect to FIG. 6, a specific implementation scheme of processing the reordered data packets (step S410) by the decompressor involved in the present document is illustrated.

in step S601, the procedure of processing the reordered data packets by the decompressor starts, and it is to proceed to step S602;

in step S602, the decompressor estimates the reorder situation of the current link according to reorder related information such as repair_num, reorder_ratio etc., and it is to proceed to step S603;

in step S603, the decompressor determines whether it needs to use a more robust reorder processing policy according to the estimation result of the reorder situation, and if it needs to use a more robust reorder processing policy, it is to proceed to step S604; and if it needs not to use a more robust reorder processing policy, it is to proceed to step S607;

in step S604, the decompressor updates a reorder_ratio_D value to a calculation result which is equal to the reorder_ratio_D value added by 1 itself, and it is to proceed to step S605;

in step S605, the decompressor sets repair_num as 0, re-estimates the reorder situation of the link, and it is to proceed to step S606;

in step S606, the decompressor encapsulates and transmits a feedback packet carrying reorder_ratio_D, and it is to proceed to step S607;

in step S607, the procedure of processing the reordered data packets by the decompressor ends.

Figure 7:
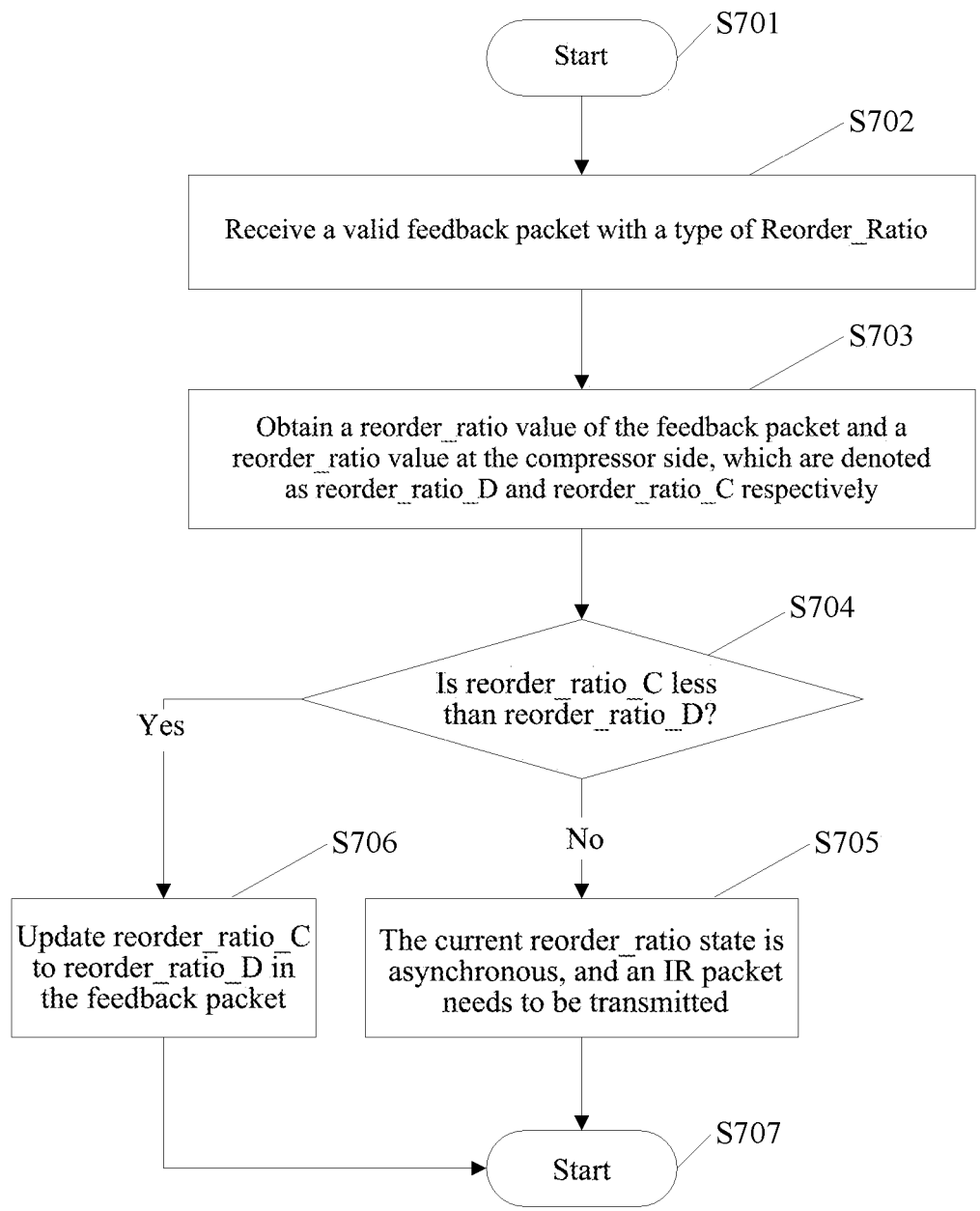
FIG. 7 is a flowchart of processing a feedback packet carrying Reorder_Ratio by a compressor according to an embodiment of the present document.

With respect to FIG. 7, a further detail description of the implementation scheme of processing the feedback packet carrying reorder_ratio by the compressor involved in the present is illustrated:

in step S701, the procedure of processing the feedback packet carrying reorder_ratio by the compressor starts, and it is to proceed to step S702;

in step S702, the compressor receives a valid feedback packet with a type of Reorder_Ratio, and it is to proceed to step S703;

in step S703, the compressor obtains a reorder_ratio value of the feedback packet and a reorder_ratio value at the compressor side, which are denoted as reorder_ratio_D and reorder_ratio_C respectively, and it is to proceed to step S704;

in step S704, the compressor compares the reorder_ratio_D in the feedback packet and the local reorder_ratio_C value, if reorder_ratio_C is less than reorder_ratio_D, it is to proceed to step S706; otherwise, it is to proceed to step S705;

in step S705, the compressor considers that the current reorder_ratio state is asynchronous, and an IR packet needs to be transmitted, and it is to proceed to step S707;

in step S706, the compressor updates reorder_ratio_C to reorder_ratio_D in the feedback packet, and it is to proceed to step S707;

in step S707, the procedure of processing the feedback packet carrying reorder_ratio by the compressor ends.

Figure 8:
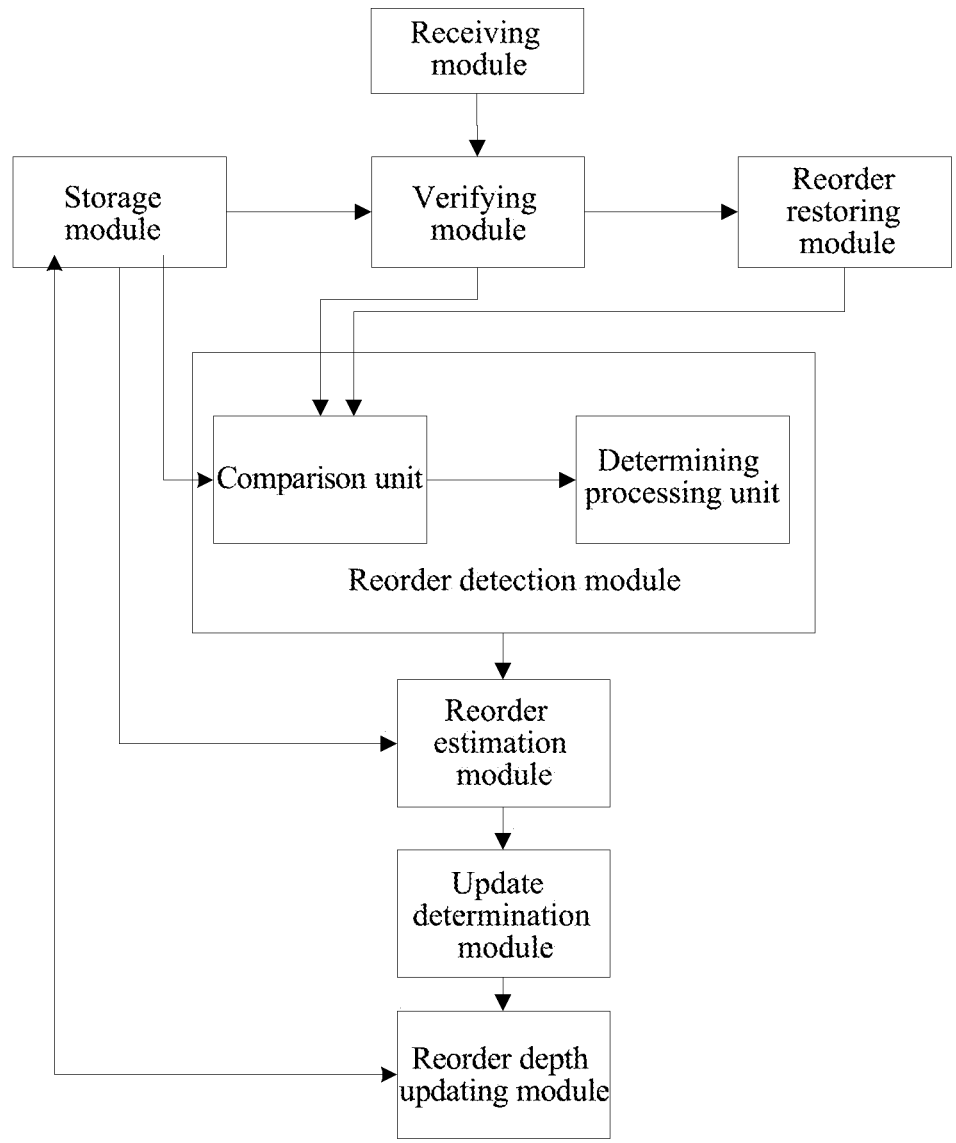
FIG. 8 is a block diagram of a decompressor according to an embodiment of the present document.

In order to implement the above method, the embodiment of the present document further provides a decompressor, as shown in FIG. 8, comprising:

a receiving module, configured to receive robust header compression data packets;

a storage module, configured to store a reorder depth value;

a reorder detection module, connected with the receiving module, and configured to detect whether a reorder occurs in data packets received by the receiving module, and transmit a reorder estimation instruction when it is detected that the reorder occurs;

a reorder estimation module, connected with the reorder detection module, and configured to estimate a reorder situation according to the reorder estimation instruction to get an estimation result;

an update determination module, connected with the reorder estimation module, and configured to determine whether it is needed to use a more robust reorder processing policy according to the estimation result, and if it is needed, transmit a reorder depth update instruction; and a reorder depth updating module, connected with both the storage module and the update determination module, and configured to update the reorder depth value in the storage module to a greater value according to the reorder depth updating instruction, and transmit a feedback packet carrying the updated reorder depth value.

Wherein, the storage module is further configured to store a current maximum sequence number. The reorder detection module comprises: a comparison unit, configured to compare a sequence number of the received data packet with the current maximum sequence number to get a comparison result; and a determining processing unit, connected with both the comparison unit and the storage module, and configured to obtain and determine the comparison result, and if the comparison result is that the sequence number of the received data packet is less than the current maximum sequence number, consider that the reorder occurs; otherwise, consider that the reorder does not occur, and update the maximum sequence number in the storage module to the sequence number of the received data packet.

Wherein, the storage module is further configured to store a restoration success number record. The reorder detection module is further configured to perform reorder detection only after receiving a detection control instruction. The decompressor can further comprise: a verifying module, located between the receiving module and the reorder detection module, and configured to recover the data packet according to the sequence number of the received data packet, verify the recovered data packet, if the verification is successful, transmit the detection control instruction to the reorder detection module; and if the verification is failed, transmit a reorder restoring instruction; and a reorder restoring module, connected to both the verifying module and the reorder detection module, and configured to determine whether the reorder depth value in the storage module can be further increased, if it can not be increased, consider that the restoration is failed, and discard the data packet; and if it can be increased, perform recovery calculation on the sequence number using a greater value as the reorder depth value at the decompressor side, recover the data packet with a recovered new sequence number, verify the recovered data packet, and if the verification is failed, consider that the restoration is failed, and discard the data packet; and if the verification is successful, consider that the restoration is successful, and update a restoration success number record, and transmit the detection control instruction to the reorder detection module.

Wherein, the reorder estimation module estimates the reorder situation according to a restoration success number record and the reorder depth value in the storage module when estimating the reorder situation. The reorder depth updating module further sets the restoration success number record in the storage module as an initial value after updating the reorder depth value in the storage module.

Wherein, the greater value can be equal to a value which is the reorder depth value at the decompressor side added by 1 itself. The reorder depth value comprises 0, 1, 2, 3.

Figure 9:
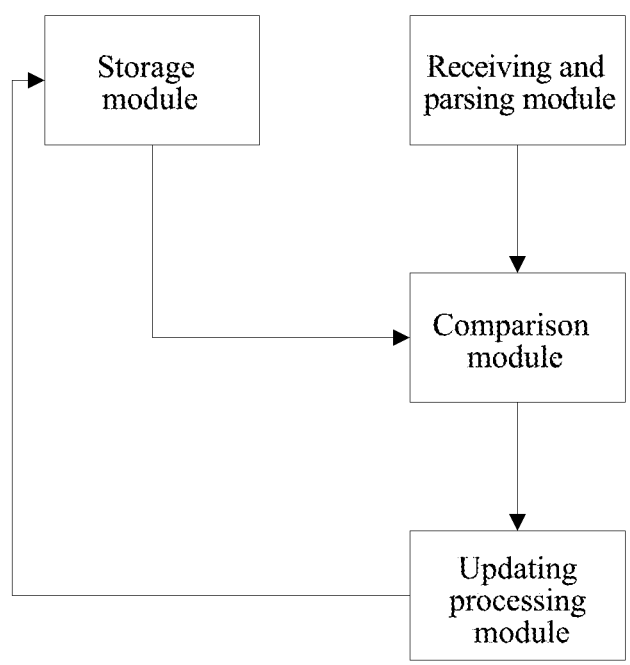
FIG. 9 is a block diagram of a compressor according to an embodiment of the present document.

In order to implement the above method, the embodiment of the present document further provides a compressor, as shown in FIG. 9, comprising:

a storage module, configured to store a reorder depth value;

a receiving and parsing module, configured to receive a feedback packet comprising a reorder depth value and parse out the reorder depth value from the feedback packet;

a comparison module, connected with both the receiving and parsing module and the storage module, and configured to compare whether the reorder depth value in the storage module is less than the reorder depth value in the feedback packet to get a comparison result; and an updating processing module, connected with the storage module and the comparison module, and configured to update the reorder depth value in the storage module to the reorder depth value in the feedback packet when the comparison result is that the reorder depth value in the storage module is less than the reorder depth value in the feedback packet; otherwise, transmit an Initialization and Refresh (IR) packet to perform reorder depth value synchronization with a decompressor.

Of course, the present document can have a variety of other embodiments, and those skilled in the art can make various corresponding changes and variations according to the present document without departing the spirit and the substance of the present document, but these corresponding changes and variations should belong to the protection scope of the accompanying claims of the present document.

INDUSTRIAL APPLICABILITY

The method and system for updating a reorder depth in robust header compression provided by the embodiments of the present document can effectively update the reorder depth according to the reorder conditions, so as to dynamically adjust the LSB P value, which not only effectively ensures the robustness of the current compression policy, but also ensures the compression efficiency.

What is claimed is:

1. A method for updating a reorder depth in robust header compression, comprising:
when determining that a reorder occurs in data packets, a decompressor estimating a reorder situation, and determining whether a more robust reorder processing policy needs to be used according to the reorder situation; if the more robust reorder processing policy needs not to be used, maintaining a reorder depth value at the decompressor side; if the more robust reorder processing policy needs to be used, updating the reorder depth value at the decompressor side to a greater value, and transmitting a feedback packet carrying the updated reorder depth value to a compressor, so that the compressor updates a reorder depth value at the compressor side according to the reorder depth value in the feedback packet;
wherein, the compressor updating the reorder depth value at the compressor side according to the reorder depth value in the feedback packet comprises:
determining whether the reorder depth value at the compressor side is less than the reorder depth value in the feedback packet, if yes, updating the reorder depth value at the compressor side to the reorder depth value in the feedback packet; otherwise, transmitting an Initialization and Refresh (IR) packet to the decompressor to perform reorder depth value synchronization.

2. The method according to claim 1, wherein, the decompressor determining whether a reorder occurs in data packets comprises:
comparing a sequence number of a received data packet with a recorded current maximum sequence number; and if the sequence number of the received data packet is less than the maximum sequence number, considering that the reorder occurs; otherwise, considering that the reorder does not occur, and updating the maximum sequence number to the sequence number of the received data packet.

3. The method according to claim 2, wherein, before the decompressor determines whether a reorder occurs in data packets, the method further comprises:
recovering the data packet according to the sequence number of the received data packet, verifying the recovered data packet, if the verification is successful, performing reorder determination; if the verification is failed, performing reorder restoring, and if the restoration is successful, performing the reorder determination; and if the restoration is failed, discarding the data packet and not performing the reorder determination;
wherein, the reorder restoring comprises: determining whether the reorder depth value at the decompressor side can be increased, if the reorder depth value at the decompressor side can not be increased, considering that the restoration is failed; if the reorder depth value at the decompressor side can further be increased, performing recovery calculation on the sequence number using a greater value as the reorder depth value at the decompressor side, recovering the data packet with a recovered new sequence number, verifying the recovered data packet, and if the verification is failed, considering that the restoration is failed, and if the verification is successful, considering that the restoration is successful and updating a restoration success number record.

4. The method according to claim 3, wherein,
the decompressor estimating the reorder situation comprises: estimating the reorder situation according to the restoration success number record and the reorder depth value at the decompressor side;
after the decompressor updates the reorder depth value at the decompressor side, setting the restoration success number record as an initial value.

5. The method according to claim 1, wherein,
the greater value is equal to a value which is the reorder depth value at the decompressor side added by 1 itself; and
the reorder depth value comprises 0, 1, 2, 3.

6. The method according to claim 2, wherein,
the greater value is equal to a value which is the reorder depth value at the decompressor side added by 1 itself; and
the reorder depth value comprises 0, 1, 2, 3.

7. The method according claim 3, wherein,
the greater value is equal to a value which is the reorder depth value at the decompressor side added by 1 itself; and
the reorder depth value comprises 0, 1, 2, 3.

8. The method according to claim 4, wherein,
the greater value is equal to a value which is the reorder depth value at the decompressor side added by 1 itself; and
the reorder depth value comprises 0, 1, 2, 3.

9. A decompressor, comprising:
a receiving module, configured to receive robust header compression data packets;
a storage module, configured to store a reorder depth value;
a reorder detection module, connected with the receiving module, and configured to detect whether a reorder occurs in data packets received by the receiving module, and transmit a reorder estimation instruction when it is detected that the reorder occurs;
a reorder estimation module, connected with the reorder detection module, and configured to estimate a reorder situation according to the reorder estimation instruction to get an estimation result;
an update determination module, connected with the reorder estimation module, and configured to determine whether a more robust reorder processing policy needs to be used according to the estimation result, and if yes, transmit a reorder depth update instruction; and
a reorder depth updating module, connected with both the storage module and the update determination module, and configured to update the reorder depth value in the storage module to a greater value according to the reorder depth updating instruction, and transmit a feedback packet carrying the updated reorder depth value to a compressor, so that the compressor determines whether the reorder depth value at the compressor side is less than the reorder depth value in the feedback packet, if yes, the compressor updates the reorder depth value at the compressor side to the reorder depth value in the feedback packet; otherwise, the compressor transmits an Initialization and Refresh (IR) packet to the decompressor to perform reorder depth value synchronization.

10. The decompressor according to claim 9, wherein,
the storage module is further configured to store a current maximum sequence number;
the reorder detection module comprises:
a comparison unit, configured to compare a sequence number of the received data packet with the current maximum sequence number to get a comparison result; and
a determining processing unit, connected with both the comparison unit and the storage module, and configured to obtain and determine the comparison result, and if the comparison result is that the sequence number of the received data packet is less than the maximum sequence number, consider that the reorder occurs; otherwise, consider that the reorder does not occur, and update the maximum sequence number in the storage module to the sequence number of the received data packet.

11. The decompressor according to claim 10, wherein,
the storage module is further configured to store a restoration success number record;
the reorder detection module is further configured to perform reorder detection only after receiving a detection control instruction;
the decompressor further comprises:
a verifying module, located between the receiving module and the reorder detection module, and configured to recover the data packet according to the sequence number of the received data packet, verify the recovered data packet, if the verification is successful, transmit the detection control instruction to the reorder detection module; and if the verification is failed, transmit a reorder restoring instruction; and
a reorder restoring module, connected to both the verifying module and the reorder detection module, and configured to determine whether the reorder depth value in the storage module can be further increased, if the reorder depth value in the storage module can not be increased, consider that a restoration is failed, and discard the data packet; and if the reorder depth value in the storage module can be increased, perform recovery calculation on the sequence number using a greater value as the reorder depth value at the decompressor side, recover the data packet with a recovered new sequence number, verify the recovered data packet, and if the verification is failed, consider that the restoration is failed, and discard the data packet; and if the verification is successful, consider that the restoration is successful, and update a restoration success number record, and transmit the detection control instruction to the reorder detection module.

12. The decompressor according to claim 11, wherein,
the reorder estimation module is configured to estimate the reorder situation according to a restoration success number record and the reorder depth value in the storage module when estimating the reorder situation;
the reorder depth updating module is further configured to set the restoration success number record in the storage module as an initial value after updating the reorder depth value in the storage module.

13. The decompressor according to claim 9, wherein,
the greater value is equal to a value which is the reorder depth value at the decompressor side added by 1 itself; and
the reorder depth value comprises 0, 1, 2, 3.

14. The decompressor according to claim 10, wherein,
the greater value is equal to a value which is the reorder depth value at the decompressor side added by 1 itself; and
the reorder depth value comprises 0, 1, 2, 3.

15. The decompressor according to claim 11, wherein,
the greater value is equal to a value which is the reorder depth value at the decompressor side added by 1 itself; and
the reorder depth value comprises 0, 1, 2, 3.

16. The decompressor according to claim 12, wherein,
the greater value is equal to a value which is the reorder depth value at the decompressor side added by 1 itself; and
the reorder depth value comprises 0, 1, 2, 3.

17. A compressor, comprising:
a storage module, configured to store a reorder depth value;
a receiving and parsing module, configured to receive a feedback packet containing a reorder depth value and parse out the reorder depth value from the feedback packet;
a comparison module, connected with both the receiving and parsing module and the storage module, and configured to compare whether the reorder depth value in the storage module is less than the reorder depth value in the feedback packet to get a comparison result; and
an updating processing module, connected with the storage module and the comparison module, and configured to update the reorder depth value in the storage module to the reorder depth value in the feedback packet when the comparison result is that the reorder depth value in the storage module is less than the reorder depth value in the feedback packet; otherwise, transmit an Initialization and Refresh (IR) packet to perform reorder depth value synchronization with a decompressor.

\* \* \* \* \*